United States Patent
Stautner et al.

(10) Patent No.: US 9,557,009 B2
(45) Date of Patent: Jan. 31, 2017

(54) GAS RESERVOIR AND A METHOD TO SUPPLY GAS TO PLASMA TUBES

(71) Applicant: General Electric Company, Schenectady, NY (US)

(72) Inventors: Ernst Wolfgang Stautner, Niskayuna, NY (US); Joseph Darryl Michael, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 724 days.

(21) Appl. No.: 14/072,911

(22) Filed: Nov. 6, 2013

(65) Prior Publication Data

US 2015/0122670 A1    May 7, 2015

(51) Int. Cl.
| | | |
|---|---|---|
| F17C 13/00 | (2006.01) | |
| F17C 11/00 | (2006.01) | |
| B01D 53/04 | (2006.01) | |

(52) U.S. Cl.
CPC ........... *F17C 11/00* (2013.01); *B01D 53/0454* (2013.01)

(58) Field of Classification Search
CPC ...................... B01D 53/0462; B01D 2257/104; B01D 53/0454; F17C 11/00; F17C 13/00; F17C 2250/0439; F17C 2205/00
USPC ................. 96/135, 126, 121, 137, 143, 146, 251,96/127, 130, 108, 109, 112
See application file for complete search history.

(56) References Cited

U.S. PATENT DOCUMENTS

| | | |
|---|---|---|
| 3,335,550 A | 8/1967 | Stern |
| 3,372,531 A | 3/1968 | Hoenig |
| 3,429,368 A | 2/1969 | Buchhold et al. |
| 3,558,960 A | 1/1971 | Hofmann et al. |
| 3,873,871 A | 3/1975 | Hofmann |
| 3,949,260 A | 4/1976 | Bayless et al. |
| 4,034,260 A | 7/1977 | Lutz |
| 4,034,261 A | 7/1977 | Lutz et al. |
| 4,150,549 A | 4/1979 | Longsworth |
| 4,219,588 A | 8/1980 | Longsworth |
| 4,247,804 A | 1/1981 | Harvey |

(Continued)

FOREIGN PATENT DOCUMENTS

| | | |
|---|---|---|
| EP | 154165 A2 | 11/1985 |
| EP | 1276694 B1 | 11/2004 |

(Continued)

OTHER PUBLICATIONS

Frank et al., "Getter-Activated Cryogenic Thermal Switch", Advances in Cryogenic Engineering, Issue Date—1986, pp. 933-940.

*Primary Examiner* — Tuyet Vo
(74) *Attorney, Agent, or Firm* — Francis T. Coppa (57) ABSTRACT

A reservoir for storing and supplying a portion of a reservoir gas into a gas-filled tube is presented. The reservoir includes a first vessel having a thermally conductive surface, a meshed vessel having a lid, and placed inside the first vessel to form a cavity between the meshed vessel and the first vessel, at least one tray placed inside the meshed vessel to divide an inner space of the meshed vessel into a plurality of compartments, a sorbent material placed inside the plurality of compartments in the meshed vessel, a temperature control device positioned such that a first portion of the temperature control device is in physical contact with at least a portion of the thermally conductive surface, and a change in the temperature of the temperature control device changes the temperature of the sorbent material, wherein the reservoir gas is retained by the sorbent material at the storage temperature.

21 Claims, 3 Drawing Sheets

(56) References Cited

U.S. PATENT DOCUMENTS

| | | | |
|---|---|---|---|
| 4,325,220 | A | 4/1982 | McFarlin |
| 4,442,383 | A | 4/1984 | Hill |
| 4,596,945 | A | 6/1986 | Schumacher et al. |
| 4,771,823 | A | 9/1988 | Chan |
| 4,791,791 | A | 12/1988 | Flegal et al. |
| 5,877,100 | A | 3/1999 | Smith et al. |
| 6,090,477 | A | 7/2000 | Burchell et al. |
| 6,790,390 | B2 | 9/2004 | Py et al. |
| 6,843,071 | B1 | 1/2005 | Sabin et al. |
| 7,222,612 | B2 | 5/2007 | Hagler et al. |
| 2003/0092560 | A1 | 5/2003 | Von Blucher et al. |
| 2008/0229928 | A1 | 9/2008 | Urbahn et al. |

FOREIGN PATENT DOCUMENTS

| | | |
|---|---|---|
| GB | 921666 A | 3/1963 |
| GB | 939395 A | 10/1963 |
| WO | 0183368 A1 | 11/2001 |

GAS RESERVOIR AND A METHOD TO SUPPLY GAS TO PLASMA TUBES

STATEMENT REGARDING FEDERALLY SPONSORED RESEARCH & DEVELOPMENT

This invention was made with Government support under contract number DE-AR0000298 awarded by the United States Department of Energy. The Government has certain right in the invention.

BACKGROUND

A gas-filled tube, also known as a discharge tube, is an arrangement of electrodes within an insulating and temperature-resistant envelope that is gas filled. The electrodes, for example, include at least one negative electrode and at least one positive electrode. Sometimes, the electrodes alternate to act as the negative electrode (hereinafter referred to as 'cathode') and the positive electrode (hereinafter referred to as 'anode'). The gas-filled tube exploits an electric discharge phenomenon in gases, and operates by ionizing the gas with an electric field. The ionized gas is typically referred to as plasma. The ionized gas generally contains charged particles including electrons, positive ions, and/or negative ions. The gas-filled tube, for example, is a plasma switch or a plasma lamp.

Typically, the ionization of the gas is initiated by introducing charged particles into the envelope, for example by irradiating an ionizing radiation in the envelope. The charged particles, for example include free electrons, positive ions, and/or negative ions. The positive ions drift towards the cathode, while the free electrons drift towards the anode. While drifting towards the anode, the free electrons collide with neutral gas molecules of the gas. If the electric field applied to the gas-filled tube is strong enough, the free electrons gain sufficient energy to further liberate electrons during the collision of the free electrons with the neutral gas molecules. The liberated electrons and the free electrons then travel towards the anode and gain sufficient energy from the electric field to cause impact ionization when further collisions of the liberated electrons and free electrons occur with the neutral gas molecules; and the process of ionization continues. The liberated electrons are typically referred to as 'secondary electrons'. Furthermore, the ionized gas is typically referred to as 'plasma'. Generally, the secondary electrons yield is a function of an energy of an electron (secondary electron or free electron) colliding with a neutral gas atom and/or molecule. Furthermore, secondary electrons may also be generated by ions (heavy particles) with the cathode.

Typically, gas-filled tubes are based on hydrogen plasmas. In operation, the gas filled in the gas-filled tubes is typically hydrogen. Generally, the secondary electrons emitted as a function of an energy of an electron (liberated electron or free electron) colliding with a neutral gas molecule for such hydrogen plasmas is less than secondary electrons emitted as a function of energy of an electron colliding with a neutral gas molecule for helium plasmas, for example. Furthermore, in the gas-filled tubes filled with hydrogen (hereinafter referred to as 'hydrogen gas filled tubes'), only about one-third of electric power supplied to the hydrogen gas-filled tubes is used for the process of ionization, and the rest of the electric power is used for other atomic processes associated with hydrogen. Accordingly, the rate of ionization as a function of the electric power supplied to the hydrogen gas-filled tubes is less than the rate of ionization as a function of the electric power in helium gas-filled tubes, for example.

Usage of helium gas in the gas-filled tubes (hereinafter referred to as 'helium gas-filled tubes') leads to better secondary electron yield as a function of energy of an electron (liberated electron or free electron) than usage of the gas hydrogen. Furthermore, usage of helium in the gas-filled tubes leads to a better rate of ionization as a function of the electric power supplied to the hydrogen gas-filled tubes. However, regulation and control of pressure of helium in the helium gas-filled tubes is a challenge. Furthermore, typically large helium vessels are available and used for regulation and control of pressure of helium in the helium gas-filled tube.

Accordingly, helium reservoirs for supplying helium to gas-filled tubes are required. Furthermore, helium reservoirs for regulating and controlling the pressure of helium in the gas-filled tubes are required.

BRIEF DESCRIPTION

A reservoir for storing and supplying a portion of a reservoir gas into a gas-filled tube is presented. The reservoir includes a first vessel having a thermally conductive surface, a meshed vessel having a lid, and placed inside the first vessel to form a cavity between the meshed vessel and the first vessel, at least one tray placed inside the meshed vessel to divide an inner space of the meshed vessel into a plurality of compartments, a sorbent material placed inside the plurality of compartments in the meshed vessel, a temperature control device positioned such that a first portion of the temperature control device is in physical contact with at least a portion of the thermally conductive surface, and a change in the temperature of the temperature control device changes the temperature of the sorbent material, wherein the reservoir gas is retained by the sorbent material at the storage temperature.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. As used herein, the term "and/or" includes any and all combinations of one or more of the associated listed items.

Approximating language, as used herein throughout the specification and claims, may be applied to modify any quantitative representation that could permissibly vary without resulting in a change in the basic function to which it may be about related. Accordingly, a value modified by a term such as "about" is not limited to the precise value specified. In some instances, the approximating language may correspond to the precision of an instrument for measuring the value.

A body/component 'A' is in direct physical contact with a body/component 'B' when a surface of the body 'A' touches a surface of the body 'B'. A body/component 'A' is in indirect physical contact with a body/component 'B' when a body/component 'C' is in direct physical contact with 'A' and 'B', such that any change in the temperature of 'A' leads to conduction of heat though 'C' to change the temperature of 'B', or vice versa. A body/component 'C' indirectly conducts heat from a body/component 'A' to a body/component 'B' when a body 'C' is in direct physical contact with 'A' and 'B', such that any change in the temperature of 'A' leads to conduction of heat though 'C' to change the temperature of 'B', or vice versa.

Figure 1:
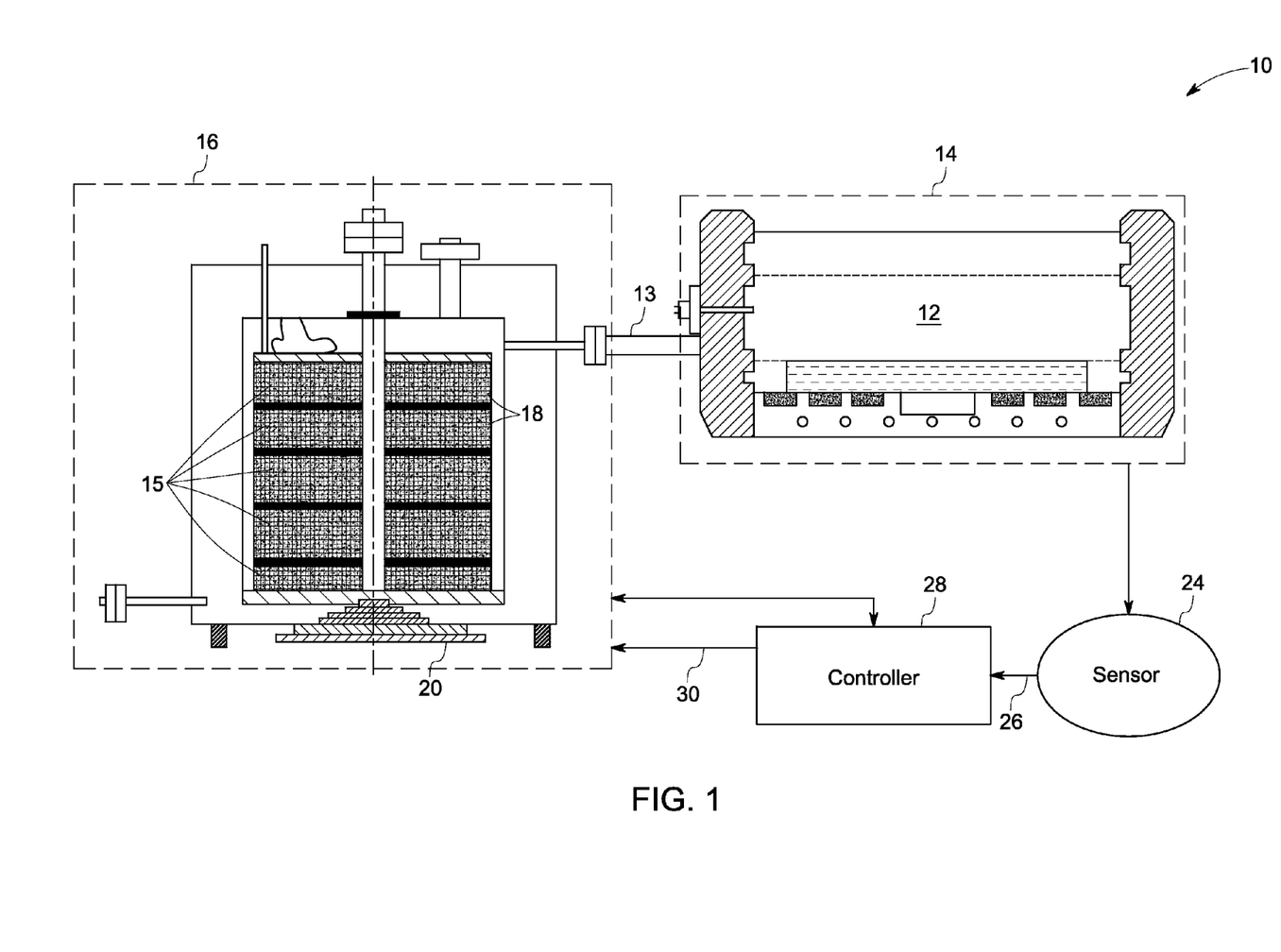
FIG. 1 is a diagrammatic illustration of a system including a reservoir to supply reservoir gas into a gas-filled tube, in accordance with one embodiment of the present systems.

FIG. 1 is a diagrammatic illustration of a system 10 to regulate pressure of a filled-in gas 12 in a gas-filled tube 14, in accordance with one embodiment of the present techniques. The system 10 includes a reservoir 16 that may supply a portion of reservoir gas 18 into the gas-filled tube 14 to increase the pressure of the filled-in gas 12 in the gas-filled tube 14. Furthermore, the reservoir 16 may pull back a portion of the filled-in gas 12 from the gas-filled tube 14 into the reservoir 16 to decrease the pressure of the filled-in gas 12. As used herein, the term "filled-in gas" refers to a gas that is inside the gas-filled tube 14. The gas-filled tube 14, for example, may be a plasma switch, a plasma lamp, or the like. In the presently contemplated configuration, the gas-filled tube 14 is a plasma switch. In one example the gas-filled tube 14 is a plasma switch. However, the gas-filled tube 14 should not be restricted to the plasma switch. The reservoir gas 18 and the filled-in gas 12, for example may be helium. The reservoir 16 is coupled to the gas-filled tube 14 via a gas supply evacuation line 13.

Figure 2:
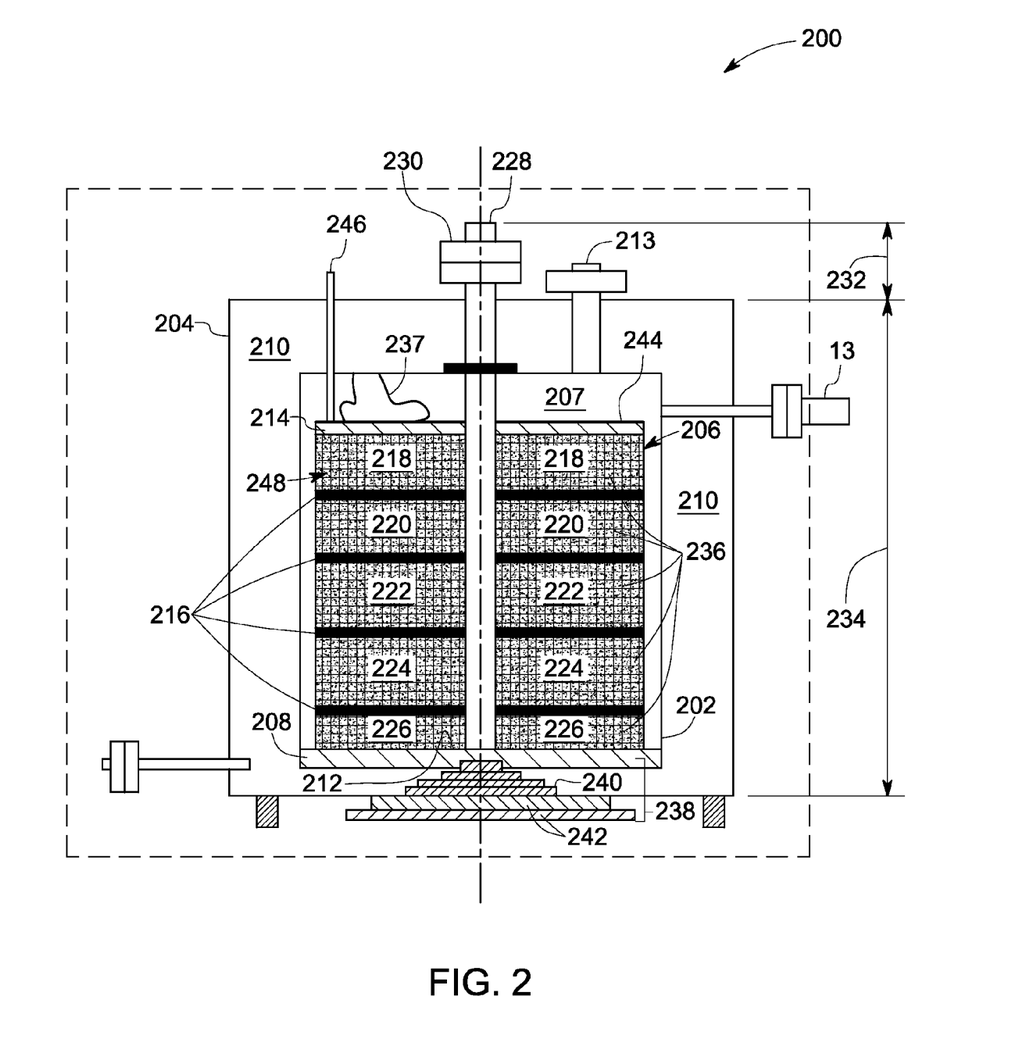
FIG. 2 is a diagrammatic illustration of a reservoir, in accordance with one embodiment of the present techniques.

The reservoir 16 stores the reservoir gas 18, and a sorbent material 15. Particularly, the reservoir gas 18 is stored as adsorbed in the sorbent material 15 at a storage temperature. For example, when the reservoir gas 18 is helium, the storage temperature of the sorbent material 15 is maintained in the range of about −80° C. to about −100° C. As used herein, the term "storage temperature" refers to a temperature of a sorbent material at which a gas is adsorbed and maintained as adsorbed in the sorbent material. The sorbent material 15 will be explained in greater detail with reference to FIG. 2. The reservoir 16 further includes a temperature control device 20 that maintains the temperature of the sorbent material 15 at the storage temperature. In one embodiment, the temperature control device 20, for example, may be a heater a cooler, or a combination thereof. In one embodiment, the reservoir 16 includes a heat transfer mechanism (an example is shown in FIG. 2).

In one embodiment, at least a portion of the temperature control device 20 is in direct or indirect physical contact with the sorbent material 15 via the heat transfer mechanism. The heat transfer mechanism, for example, may include an arrangement of a thermally conductive vessel that contains the sorbent material 15, one or more thermally conductive trays spread across the sorbent material 15, at least one thermally conductive base in physical contact with the thermally conductive vessel, or the like.

The system 10 further includes at least one sensor 24 that measures the pressure of the filled-in gas 12 inside the gas-filled tube 14. Furthermore, the sensor 24 generates signals 26 representative of the pressure of the filled-in gas 12 inside the gas-filled tube 14. The sensor 24 is in an operational communication with a controller 28 that receives the signals 26. The controller 28 determines the pressure of the filled-in gas 12 based upon the signals 26, and then compares the pressure of the filled-in gas 12 to a required pressure threshold. As used herein, the term "required pressure threshold" refers to a pressure of a filled-in gas, wherein the pressure is required to be maintained for operation of a gas-filled tube that contains the filled-in gas. The required pressure threshold, for example, may be received by the controller 28 from a memory device (not shown). The required pressure threshold, for example, may vary from one gas-filled tube to another gas-filled tube. When the filled-in gas 12 is helium, the required pressure threshold of the helium 18 in the gas-filled tube 14 may be in the range of about 10 mTorr to about 1000 mTorr.

Based upon the comparison of the pressure of the filled-in gas 12 to the required pressure threshold or limit, the controller 28 determines whether the pressure of the filled-in gas 12 is below or above the required pressure threshold. When the controller 28 determines that the pressure of the filled-in gas 12 is below or above the required pressure threshold, the controller 28 determines a pressure change (hereinafter referred to as 'required pressure change') required in the filled-in gas 12 to reach the required pressure threshold in the gas-filled tube 14.

The controller 28 further determines an updated temperature of the sorbent material 15 based upon the required pressure change in the filled-in gas 12. The updated temperature, for example, may be higher (warmer) or lower (cooler) than the storage temperature of the sorbent material 15. For example, the updated temperature of the sorbent material 15 is higher (warmer) than the storage temperature when the pressure of the filled-in gas 12 is lower than the required pressure threshold. Similarly, the updated temperature is lower (cooler) than the storage temperature when the pressure of the filled-in gas is higher than the required pressure threshold. It is noted that when the reservoir gas 18 stored in the reservoir 14 is helium, and the filled-in gas 12 in the gas-filled tube 14 is helium, the updated temperature of the sorbent material 15 may be in the range of about 0.01° C. to about 5° C. above or below the storage temperature.

Subsequent to the determination of the updated temperature, the controller 28 controls the reservoir 16 to regulate the pressure of the filled-in gas 12 inside the gas-filled tube 14. For regulating the pressure of the filled-in gas 12, the controller 28 controls the reservoir 16 to change the storage temperature of the sorbent material 15 to reach the updated temperature of the sorbent material 15. When the sorbent material 15 reaches the updated temperature, a portion of the reservoir gas 18 is released into the gas-filled tube 14, or a portion of the filled-in gas 12 is pulled back from the gas-filled tube 14. For example, when the updated temperature of the sorbent material 15 is warmer than the storage temperature, and thus the sorbent material 15 is heated to become warmer than the storage temperature, a portion of the reservoir gas 18 is released from the sorbent material 15 into the gas-filled tube 14. Similarly, when the updated temperature of the sorbent material 15 is cooler than the storage temperature, the sorbent material 15 is cooled down to become cooler than the storage temperature, and a portion of the filled-in gas 12 is pulled back from the gas-filled tube 14 into the sorbent material 15.

Example of Controlling the Reservoir 16 by the Controller 28

In the presently contemplated configuration, the controller 28 controls the reservoir 16 via the temperature control device 20. The temperature control device 20 is in an operational communication with the controller 28. In the presently contemplated configuration, the controller 28 generates control signals 30 that change the temperature of the temperature control device 20 to the updated temperature, or substantially equal to the updated temperature. For example, when the updated temperature is warmer than the storage temperature, the controller 28 increases (warms up) the temperature of the temperature control device 20 to reach the updated temperature of the temperature control device 20. Similarly, when the updated temperature is cooler than the storage temperature, the controller 28 decreases (cools down) the temperature of the temperature control device 20 to reach the updated temperature of the temperature control device 20.

As previously noted at least a portion of the temperature control device 20 is in direct or indirect physical contact with the sorbent material 15 via the heat transfer mechanism. The heat transfer mechanism conducts the change in the temperature of the temperature control device 20 from the temperature control device 20 to the sorbent material 15. Accordingly, the change in the temperature of the temperature control device 20 changes the temperature of the sorbent material 15. Therefore, when the temperature of the temperature control device 20 decreases, the temperature of the sorbent material 15 decreases. Similarly, when the temperature of the temperature control device 20 increases, the temperature of the sorbent material 15 increases. The conduction of the change in the temperature of the temperature control device 20 to the sorbent material 15 continues till the sorbent material 15 reaches the updated temperature.

When the temperature of the sorbent material 15 is the updated temperature, the portion of the reservoir gas 18 supplied into the gas-filled tube 14, or the portion of the filled-in gas 12 is pulled back from the gas-filled tube 14 into the reservoir 16. Particularly, when the updated temperature of the sorbent material 15 is higher (warmer) than the storage temperature, the portion of the reservoir gas 18 is supplied into the gas-filled tube 14. The portion of the reservoir gas 18, for example flows through the gas filling evacuation line 13 from the reservoir 16 into the gas-filled tube 14. When the updated temperature of the sorbent material 15 is lower (cooler) than the storage temperature, the portion of the filled-in gas 12 is pulled back from the gas-filled tube 14. The portion of the filled-in gas 12, for example flows through the gas filling evacuation line 13 or a capillary tube sized tubing (not shown) from the gas-filled tube 14 into the reservoir 16. As previously noted, the supplying of the portion of the reservoir gas 18 into the gas-filled tube 14 increases the pressure of the filled-in gas 12. Furthermore, pulling back the portion of the filled-in gas 12 from the gas-filled tube 14 into the reservoir 16 decreases the pressure of the filled-in gas 12.

In one embodiment, the controller 28 may continuously control the temperature control device 20 to change or maintain the temperature of the sorbent material 15 at the updated temperature until the pressure of the filled-in gas 12 reaches the required pressure. In one embodiment, the temperature control device 20 may be a smart temperature control device 20 that is not controlled by the controller 28, and may receive the signals 26 from the sensor 24. Furthermore, the smart temperature control device 20 may change or maintain the temperature of the sorbent material 15 based upon the signals 26 to regulate the pressure of the filled-in gas 12 inside the gas-filled tube 14.

FIG. 2 shows a cross-section of a reservoir 200, in accordance with one embodiment of the present techniques. The reservoir 200, for example, is the reservoir 16 referred to in FIG. 1. The reservoir 200 may be controlled to regulate the pressure of a filled-in gas in the gas-filled tube 14 (shown in FIG. 1), such as, the plasma switch (see FIG. 1). The reservoir 200 may be controlled to supply, replenish, or fine dose a reservoir gas, such as, the reservoir gas 18 (see FIG. 1), into the gas-filled tube 14, such as, the plasma switch. The reservoir 200 may be controlled to pull back a portion of a filled-in gas, such as the filled-in gas 12 (see FIG. 1) in the gas-filled tube. In the presently contemplated configuration, the reservoir 200 is a helium reservoir 200. It is noted that while FIG. 2 is explained with reference to the reservoir 200, the reservoir 200 should not be restricted to the helium reservoir.

As shown in the presently contemplated configuration, the reservoir 200 includes a first vessel 202, a second vessel 204, and a meshed vessel 206. In one embodiment, the second vessel 204 is placed around the first vessel 202. As shown in the presently contemplated configuration, the first vessel 202 is placed inside the second vessel 204. In one example, the first vessel 202 is referred to as the inner vessel; and the second vessel 204 shall be referred to as the outer vessel. It is noted that the first vessel 202 and the second vessel 204 are vacuum sealed boxes, and are made of a thermally resistive material, except a thermally conductive surface 208 of the first vessel 202. For example, the first vessel 202 and the second vessel 204 may be made of a thermally insulative material, such as, stainless steel, borosilicate glass, or another suitable material. In the presently shown embodiment, the thermally conductive surface is a thermally conductive base.

The thermally conductive base 208 of the inner vessel 202 is made of a thermally conductive material, such as, copper, or other suitable material. In one embodiment, the first vessel 202 and the second vessel 204 may be cylindrical in shape. The first vessel 202 is separated from the second vessel 204 to form a chamber 210 between the first vessel 202 and the second vessel 204. The chamber 210 is a vacuum sealed chamber. In one embodiment, the chamber 210 may have multi-layer insulation sheets (not shown in FIG. 2) to thermally insulate the first vessel 202 from the second vessel 204. In another embodiment, the chamber 210 may be filled with aerogels to thermally insulate the first vessel 202 from the second vessel 204. It is noted that the chamber 210 may not be filled with insulative gases as the insulative gases may increase heat load on a sorption material 236. The first vessel 202 is connected to the gas-filled tube 14 via the gas supply evacuation line 13 (also shown in FIG. 1).

As previously noted, the reservoir 200 contains the meshed vessel 206. The lateral surface of the meshed vessel 206 is made of a mesh of a thermally conductive material, such as copper, although other suitable materials can also be used. In the presently contemplated configuration, the meshed vessel 206 is a hollow cylinder with a lid 214. It is noted that while in the presently contemplated configuration, the meshed vessel 206 is cylindrical; however, the meshed vessel 206 may be made of any other suitable shape. Furthermore, as previously noted the first vessel 202 is placed about the meshed vessel 206. In one embodiment, the meshed vessel 206 is smaller in size in comparison to the size of the first vessel 202. Therefore, when the smaller meshed vessel 206 is placed inside the first vessel 202 a cavity 207 is created between the meshed vessel 206 and the first vessel 202. Accordingly, the meshed vessel 206 is separated from the first vessel 202 by the cavity 207. Furthermore, the meshed vessel 206 is positioned inside the first vessel 202, such that a bottom (not shown by reference numeral) of the meshed vessel 206 is in direct physical contact with an inner surface 212 of the thermally conductive base 208 of the first vessel 202. In one embodiment, when the meshed vessel 206 has a meshed vessel base (not shown), an outer surface of the meshed vessel base (not shown) is in direct physical contact with the inner surface 212 of the thermally conductive base 208 of the first vessel 202. It is noted that in the presently shown configuration, the meshed vessel 206 does not have a base. Therefore, in the presently contemplated configuration, a bottom rim (not shown) of the meshed vessel 206 is in direct physical contact with the inner surface 212 of the thermally conductive base 208. Furthermore, the cavity 207 is connected to a reservoir gas supply evacuation line 213. The reservoir gas supply evacuation line 213, for example, may be used to fill-in the reservoir gas into the cavity 207 that is adsorbed by the sorbent material 15 at the storage temperature. Furthermore, the reservoir gas evacuation line 213 may be used to evacuate gases or other contaminants released by the sorbent material 236. In the presently contemplated configuration, the reservoir 200 is the helium reservoir; therefore, the gas supply evacuation line 213 may be used to fill helium in the first vessel 202 or in the cavity 207. It is noted that while the presently shown embodiment has a single gas-filling line evacuation line 213, the first vessel 202 may have an evacuation line separate from a gas filling line.

The meshed vessel 206 contains at least one tray 216 placed inside the meshed vessel 206 to divide an inner space of the meshed vessel 206 into multiple compartments 218, 220, 222, 224, 226. In the presently contemplated configuration, four trays 216 are mounted inside the meshed vessel 206 to divide the inner space of the meshed vessel 206 into the five compartments 218, 220, 222, 224, 226. In this example, outer perimeters of the trays 216 are in direct physical contact with an inner lateral surface of the meshed vessel 206. In the presently contemplated configuration, the trays 216 are circular discs, and are horizontally and evenly placed inside the meshed vessel 206. The trays 216 are placed inside the meshed vessel 206, such that, the trays 216 are parallel to the thermally conductive base 208, the lid 214, and to one another. In the presently contemplated configuration, due to a constant radius of the cylindrical meshed vessel 206, and the horizontal placement of the trays 216, the radius of each of the trays 216 is similar. In one embodiment, the trays 216 may be arranged vertically inside the meshed vessel 206. In the embodiment, when the trays 216 are placed vertically inside the meshed vessel 206, the trays 216 may be rectangular in shape, and the breadth of a tray in the trays 216 may vary from a width of another tray in the trays 216. In one embodiment, the trays 216 may be unevenly placed inside the meshed vessel 206.

The reservoir 200 further includes a vertical hollow tube 228, hereinafter referred to as tube 228. The tube 228 may be opened or closed using a tube lid 230. A first portion 232 of the tube 228 is outside the first vessel 202, the second vessel 204, and the meshed vessel 206; and a second portion 234 of the tube 228 vertically passes through center of the second vessel 204, the first vessel 202, the meshed vessel 206, the lid 214, and the trays 216, such that, a bottom end (not shown by reference numeral) of the tube 228 is in direct physical contact with the inner surface 212 of the thermally conductive base 208 of the first vessel 202. Furthermore, the tube 228 passes through the trays 216, such that the tube 228 is in direct physical contact with the trays 216.

As shown in this embodiment, the tube 228 is approximately perpendicular to the thermally conductive base 208, and the trays 216. It is noted that the thermally conductive base 208 does not have a hole, and therefore, the tube 228 does not pass through the thermally conductive base 208. It is noted that the tube 228 is made of a thermally conductive material, such as, copper, or any other suitable thermally conductive material.

Furthermore, the meshed vessel 206 is filled-in with a sorbent material 236. The sorbent material 236, for example, may be the sorbent material 15 referred to in FIG. 1. The sorbent material 236 is formed of a material having a high rate of adsorption at low temperatures. In one embodiment, sorbent material 236 is composed of activated charcoal that has a high rate of adsorption due to its large total surface area. The surface area of the activated charcoal, for example, is in the range of about 300 to 3000 square meters per gram. In one embodiment, the surface area of the activated charcoal may be greater than 3000 $m^2$/g. In one embodiment, the sorbent material 236 may be composed of a synthetic zeolite material. The sorbent material 236, for example, may include coconut carbon, coke carbon, activated charcoal, carbon nanotubes, or the like. The sorbent material 236, for example, may be selected based upon various reasons, such as, required reduction in the size of the reservoir 200, expected sorption efficiency, or the like.

The sorbent material 236 is in direct physical contact with the internal lateral surface of the meshed vessel 206. Particularly, the sorbent material 236 is filled inside the compartments 218, 220, 222, 224, 226 in the meshed vessel 206. As shown in FIG. 2, a portion of the sorbent material 236 filled in the compartment 218 is in direct physical contact with the lid 214 and a tray in the trays 216. Furthermore, each portion of the sorbent material 236 filled in the compartments 218, 220, 222, 224 is in direct physical contact with two trays in the trays 216. Additionally, a portion of the sorbent material 236 filled in the compartment 226 is in a direct physical contact with a tray in the trays 216 and the thermally conductive base 208.

Furthermore, the reservoir 200 includes a temperature control device 238. The temperature control device 238, for example, is the temperature control device 20 referred to in FIG. 1. At least a first portion 240 of the temperature control device 238 is positioned inside the vacuum sealed chamber 210. The positioning of the first portion 240 of the temperature control device 238 prevents the temperature of the temperature control device 238 from the impact of the surrounding environment. Additionally, a second portion 242 of the temperature control device 238 is located outside the second vessel 204. The positioning of the second portion 242 of the temperature control device 238 outside the second vessel 204 allows any heat generated by the temperature control device 238 to be exhausted in the ambient environment. At least a portion of the temperature control device 238 is in physical contact with at least a portion of a thermally conductive surface of the first vessel 202. In the presently contemplated configuration, the first portion 240 of the temperature control device 202 is in direct physical contact with a portion of the thermally conductive base 208 of the first vessel 202. The temperature control device 238, for example may be a heater cooler, a thermoelectric refrigerator, a thermoelectric heater, or the like.

The temperature control device 238 functions to maintain the temperature of the sorbent material 236, increase the temperature of the sorbent material 236 or decrease the temperature of the sorbent material 236. In one embodiment, the temperature control device 238 may be controlled to change the temperature of the temperature control device 238 to reach an updated temperature. In another embodiment, the temperature control device 238 may be a smart device that changes respective temperature based upon signals (e.g. the signals 26 referred to in FIG. 1) representative of pressure of a gas in a gas-filled tube, such as, the plasma switch (see FIG. 2). The change in the temperature of the temperature control device 238 leads to change in the temperature of the thermally conductive base 208 due to conduction of heat from the thermally conductive base 208 to the temperature control device 238 or from the temperature control device 238 to the thermally conductive base 208. As previously noted, the bottom end of the tube 228 and the bottom rim or bottom base of the meshed vessel 206 is in direct physical contact with the inner surface 212 of the thermally conductive base 208. Therefore, the change in the temperature of the thermally conductive base 208 changes the temperature of the tube 228 and the meshed vessel 206 due to conduction of heat from the tube 228 and the meshed vessel 206 to the base 208, or vice versa.

Furthermore, as previously noted due to the direct physical contact of the meshed vessel 206 with the trays 216 and the lid 214, the change in the temperature of the meshed vessel 206 results in change in the temperature of the trays 216 and the lid 214 due to conduction of heat from the trays 216 and the lid 214 to the meshed vessel 206, or vice versa. As previously noted, due to the direct physical contact of the sorbent material 236 with the base 208, the meshed vessel 206, the lid 214, the trays 216, the change in the temperature of the base 208, the meshed vessel 206, the lid 214, and the trays 216 changes the temperature of the sorbent material 236 due to conduction of heat. Accordingly, the change in the temperature of the temperature control device 238 maintains, increases or decreases the temperature of the sorbent material 236 due direct or indirect conduction of heat between the meshed vessel 206, the thermally conductive base 208, the lid 214, the trays 216, the tube 228 and the sorbent material 236. It is noted that in FIG. 2, the arrangement of the meshed vessel 206, the thermally conductive base 208, the lid 214, the trays 216 and the tube 228 act as a heat transfer mechanism that directly or indirectly conducts heat between the meshed vessel 206, the thermally conductive base 208, the lid 214, the trays 216, the tube 228, the sorbent material 236 and the temperature of the temperature control device 238 due to a change in the temperature of the temperature control device 238.

In one embodiment, the reservoir 200 may include a heating layer 244 having a heating flange 246. The heating layer 244 is placed on an upper surface of the lid 214, such that the heating layer 244 is in direct physical contact with the lid 214. Since the heating layer 244 is in direct physical contact with the lid 214, any change in the temperature of the heating layer 244 is conducted to the lid 214. The heating layer 244, for example, may be a minco heater, a silicone rubber heater, a rubber heater, a thermal-clear heater, or the like. When needed, the heating layer 244 and the heating flange 246 may be used to heat up the sorbent material 236. The sorbent material 236 may be heated before storage/adsorption of the reservoir gas in the sorbent material 236. The heating of the sorbent material 236 before the storage/adsorption of the reservoir gas releases undesired gases and contaminants from the sorption material 236. The process of heating up the sorbent material 236 using the heating layer 244 is explained in further detail herein.

The first vessel 202 and the meshed vessel 206 have one or more temperature sensors 237 that measure the temperature of the sorbent material 236 inside the meshed vessel 206. Furthermore, the one or more temperature sensors 237 may generate signals (not shown) representative of temperature of the sorbent material 236. The temperature sensors 237 may be in an operational communication with a controller, such as, the controller 28 referred to in FIG. 1, and/or the temperature control device 238. The controller and/or the temperature control device 238 may use the signals (not shown) representative of temperature of the sorbent material 236 to change the temperature of the sorbent material 236.
Process of Heating Up the Sorbent Material 236 Using the Heating layer 244 and the Heating Flange 246

The heating flange 246 is connected to a power source (not shown). The connection of the heating flange 246 to the power source increases or heats up the heating layer 244. The heating up of the heating layer 244 heats up the lid 214 due to conduction of heat from the heating layer 244 to the lid 214. Due to the direct physical contact of the heated lid 214 with the meshed vessel 206, the trays 216, and the tube 228, heat from the heated lid 214 is conducted to the meshed vessel 206, the trays 216, and the tube 228. The conduction of heat from the heated lid 214 to the meshed vessel 206, the trays 216, and the tube 228 heats up the meshed vessel 206, the trays 216, and the tube 228. Furthermore, due to the direct physical contact of the heated lid 214, the heated meshed vessel 206, the heated trays 216, and the heated tube 228 with the sorbent material 236, heat is conducted from the heated lid 214, the heated meshed vessel 206, the heated trays 216, and the heated tube 228 to the sorbent material 236 resulting in heating up of the sorbent material 236. Accordingly, the heating up of the heating layer 244 directly or indirectly conducts heat from the heating layer 244 via the meshed vessel 206, the lid 214, the heated trays 216, and the tube 228 to the sorbent material 236. In certain embodiments, the sorbent material 236 may be heated by introducing hot gas into the tube 228.
Process of Storing the Reservoir Gas 14 in the Helium Reservoir 200

The present embodiment explains storage of helium in the reservoir 200. However, the present embodiment with minor adjustments or changes may be used for storage of other gases in the reservoir 200. Initially the sorbent material 236 is heated at a determined temperature to clear off undesired gases and contaminants from the sorbent material 236. As previously explained, the sorbent material 236 may be heated using the heating layer 244 and the heating flange 246. In the presently contemplated configuration, the sorbent material 236 is heated above room temperature to clear off the undesired contaminants and gases. The increase in the temperature of the sorbent material 236 above or equal to the room temperature results in release of the undesired gases and the contaminants present in the sorbent material 236. In the presently contemplated configuration, the undesired gases and the contaminants exit the reservoir 200 through the reservoir gas supply evacuation line 213.

Subsequent to the evacuation of the contaminants and the gases, the tube 228 is filled with dry ice pellets or a combination of dry ice pellets and liquid nitrogen. After filling the dry ice pellets inside the tube 228, the tube 228 is sealed using the tube lid 230. In certain embodiments, the tube 228 may have a valve to release $CO_2$ on evaporation of the dry ice pellets. The insertion of the dry ice pellets results in cooling of the tube 228. Due to the direct physical contact of the sorbent material 236 with the tube, heat flows from the sorbent material 236 to the tube 228 to cool down the sorbent material 236. Further, the direct physical contact of the trays 216, the lid 214 and the thermally conductive base 208 with the tube 228 results in conduction of heat from the trays 216, the lid 214 and the thermally conductive base 208 to the tube 228. The conduction of heat from the trays 216, the lid 214 and the thermally conductive base 208 to the tube 228 cools down the trays 216, the lid 214 and the thermally conductive base 208. Furthermore, the direct physical contact of the trays 216, the lid 214 and the thermally conductive base 208 with the sorbent material 236 results in conduction of heat from the sorbent material 236 to the trays 216, the lid 214 and the thermally conductive base 208 to cool down the sorbent material 236.

Accordingly, the sorbent material 236 is directly cooled by the tube 228, and indirectly cooled by indirect transmission of heat from the sorbent material 236 to the tube 228 via the trays 216, the lid 214, and the thermally conductive base 208. The direct and indirect cooling of the sorbent material 236 via the trays 216, the lid 214 and the thermally conductive base 208 results in even distribution of coolness across the sorbent material 236 in the compartments 218, 220, 222, 224, 226. The cooling of the sorbent material 236 continues till the sorbent material 236 cools down to reach a storage temperature. In the presently contemplated configuration, the storage temperature is in the range of about −80° C. to −100° C. It is noted that since the present embodiment is explained with reference to storage of helium in the reservoir 200, the sorbent material 236 is cooled down till the sorbent material 236 reaches the storage temperature in the range of about −80° C. to −100° C., however, the sorbent material 236 may be cooled down to another storage temperature based upon a different gas that is to be stored in the reservoir 200.

When the sorbent material 236 reaches the storage temperature in the range of about −80° C. to about −100° C., the tube 228 is evacuated and warm helium is filled into first vessel 202 via the gas supply evacuation line 213. As used herein, the term "warm helium" is used to refer to helium that has a temperature higher than the storage temperature of the sorbent material 236, such that, the helium is warmer than the sorbent material 236.

The gas molecules of the filled-in warm helium are adsorbed by pores of the sorbent material 36, and gets stored inside the reservoir 200. The stored helium is shown by solid black dots in FIG. 2, and is referred to by reference numeral 248. Furthermore, the temperature control device 238 maintains the temperature of the sorbent material 236 at the storage temperature that falls in the range of about −80° C. to about −100° C. For maintaining the temperature of the sorbent material 236 at the storage temperature, the temperature control device 238 changes respective temperature. As previously noted the change in the temperature of the temperature control device 238 changes the temperature of the sorbent material 236 due direct or indirect conduction of heat between the meshed vessel 206, the thermally conductive base 208, the lid 214, the trays 216, the tube 228 and the sorbent material 236.

Figure 3:
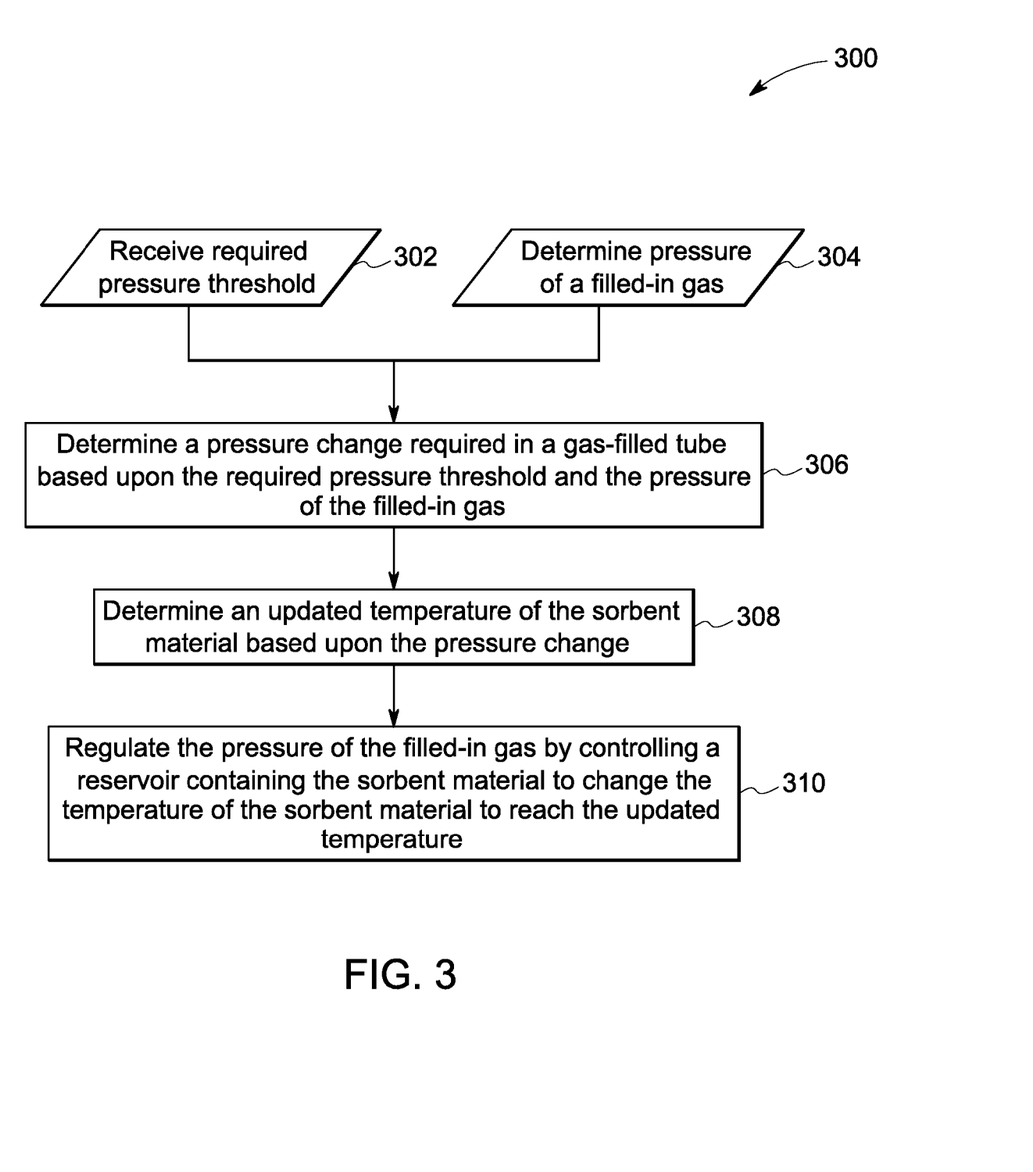
FIG. 3 is a flow chart that illustrates a method for regulating a pressure of a filled-in gas in a gas-filled tube, in accordance with certain embodiments of the present techniques.

FIG. 3 is a flow chart that illustrates a method 300 for regulating a pressure of a filled-in gas in a gas-filled tube, in accordance with certain embodiments of the present techniques. At 302, required pressure threshold of a filled-in gas in a gas-filled tube may be received. The gas-filled tube, for example, may be the gas-filled tube 14 referred to in FIG. 1. Furthermore, the filled-in gas may be the filled-in gas 12. As previously noted with reference to FIG. 1, the term "required pressure threshold" refers to a pressure of a filled-in gas, wherein the pressure is required to be maintained for operation of a gas-filled tube that contains the filled-in gas.

Furthermore, at 304, pressure of the filled-in gas may be determined. The pressure of the filled-in gas, for example, may be determined by a controller, such as, the controller 28 of FIG. 1 based upon signals (e.g. the signals 26 referred to in FIG. 1) from one or more pressure sensors (such as sensor 24) representative of the pressure of the filled-in gas. At 306, a pressure change required in the gas-filled tube may be determined The pressure change required in the gas filled tube may be determined based upon the required pressure threshold and the pressure of the filled-in gas. The pressure change required in the gas-filled tube is a difference of the required pressure threshold and the pressure of the filled-in gas. The pressure change is positive when the pressure of the filled-in gas is less than the required pressure threshold, and the pressure change is negative when the pressure of the filled-in gas is greater than the required pressure threshold, or vice versa.

At 308, an updated temperature of the sorbent material may be determined based upon the pressure change required in the gas-filled tube. The updated temperature, for example is warmer than a storage temperature of the sorbent material when the pressure change indicates that the pressure of the filled-in gas is less than the required pressure threshold. The updated temperature, for example, is cooler than the storage temperature of the sorbent material when the pressure change indicates that the pressure of the filled-in gas is higher than the required pressure threshold. In one embodiment, the pressure change may be mapped to the updated temperature using a lookup table. In one embodiment, when the pressure change indicates that the pressure of the filled-in gas is higher than the required pressure threshold, the following steps may be executed to determine the updated temperature:

a) Determine an amount of portion of a reservoir gas that is required to be supplied to the gas-filled tube to bring the pressure of the filled-in gas to the required pressure threshold based upon the pressure change; and
b) Map, using a look up table, the amount of portion of the reservoir gas to the updated temperature.

In one embodiment, when the pressure change indicates that the pressure of the filled-in gas is lower than the required pressure threshold, the following steps may be executed to determine the updated temperature:

a) Determine an amount of portion of the filled-in gas that is required to be pulled back from the gas-filled tube into the reservoir to bring the pressure of the filled-in gas to the required pressure threshold based upon the pressure change;
b) Map, using a look up table, the amount of portion of the filled-in gas to the updated temperature.

The updated temperature, for example is warmer than the storage temperature when the pressure of the filled-in gas is lower than the required pressure threshold. Furthermore, the updated temperature is cooler than the storage temperature when the pressure of the filled-in gas is higher than the required pressure threshold.

Subsequently at 310, the pressure of the filled-in gas may be regulated by controlling the reservoir containing the sorbent material. The reservoir, for example, may be the reservoir 16, 200 (see FIG. 1 and FIG. 2). The reservoir, for example, may be controlled to change the temperature of the sorbent material to reach the updated temperature. The reservoir, for example, may be controlled via a temperature control device, such as the temperature control device 20, 238, in the reservoir. When the updated temperature is warmer than the storage temperature, and the reservoir is controlled to increase the temperature of the sorbent material, the portion of the reservoir gas is released into the gas filled tube. The release of the portion of the reservoir gas into the gas-filled tube brings the pressure of the filled-in gas to the required pressure threshold. When the updated temperature is cooler than the storage temperature, and the reservoir is controlled to decrease the temperature of the sorbent material, the portion of the filled-in gas is pulled back from the gas-filled tube into the reservoir. The pull back of the portion of the filled-in gas into the reservoir brings the pressure of the filled-in gas to the required pressure threshold.

The present systems and methods present a reservoir that is used to regulate the pressure of a filled-in gas filled in a gas-filled tube, such as, a plasma switch. The reservoir regulates and controls the pressure of the filled-in gas in the gas-filled tube. Due to a fine-dosing capability of the present reservoir, the reservoir is capable of making very fine adjustments to the pressure of the filled-in gas in the gas-filled tube. Furthermore, the present reservoir is capable of storing helium, and regulating and controlling pressure of helium in a helium-filled tube. The reservoir is not required to be large to regulate and control the pressure of helium in the helium-filled tube. Furthermore, the present systems and methods present a system to regulate and control the pressure of the filled-in gas in the gas-filled tube using the reservoir.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A reservoir for storing and supplying a portion of a reservoir gas into a gas-filled tube, comprising:
    a first vessel having a thermally conductive surface;
    a meshed vessel having a lid, and placed inside the first vessel to form a cavity between the meshed vessel and the first vessel;
    at least one tray placed inside the meshed vessel to divide an inner space of the meshed vessel into a plurality of compartments;
    a sorbent material placed inside the plurality of compartments in the meshed vessel;
    a temperature control device positioned such that a first portion of the temperature control device is in physical contact with at least a portion of the thermally conductive surface, and a change in the temperature of the temperature control device changes the temperature of the sorbent material;
    wherein the reservoir gas is retained by the sorbent material at the storage temperature.

2. The reservoir of claim 1, wherein a second portion of the temperature control device is outside the reservoir.

3. The reservoir of claim 1, wherein the temperature control device comprises a thermoelectric cooler, a heater, a cooler, or combinations thereof.

4. The reservoir of claim 1, wherein an increase in the temperature of the sorbent material releases a portion of the reservoir gas into the gas-filled tube, and a decrease in the temperature of the sorbent material pulls back a portion of a filled-in gas from the gas-filled tube into the reservoir.

5. The reservoir of claim 1, wherein a lateral surface of the meshed vessel is made of a mesh of a thermally conductive material.

6. The reservoir of claim 1, wherein the meshed vessel, the lid, and the at least one tray are made of a thermally conductive material.

7. The reservoir of claim 1, wherein portions of the sorbent material are in physical contact with the lateral surface of the meshed vessel, the at least one tray, the lid, a portion of the thermally conductive surface, or combinations thereof.

8. The reservoir of claim 1, further comprising a controller that controls the temperature control device to change or maintain the temperature of the temperature control device.

9. The reservoir of claim 1, further comprising:
    a heating layer placed on an upper surface of the lid such that the heating layer is in physical contact with the lid; and
    a heating flange coupled to the heating layer,
    wherein the heating flange is selectively coupled to a power source to heat the heating layer.

10. The reservoir of claim 9, wherein the heating up of the heating layer conducts heat from the heating layer via the meshed vessel, the lid, the heated trays, and the tube to the sorbent material.

11. The reservoir of claim 1, further comprising a second vessel positioned about the first vessel to form a vacuum sealed chamber between the first vessel and the second vessel.

12. The reservoir of claim 11, wherein the first portion of the temperature control device is positioned inside the vacuum sealed chamber.

13. The reservoir of claim 11, wherein the vacuum sealed chamber is filled with at least one thermally insulating sheet, or an aerogel to isolate the first vessel from the second vessel.

14. The reservoir of claim 11, wherein the first vessel and the second vessel are made of a thermally insulating material except the thermally conductive surface of the first vessel, and the first vessel and the second vessel are vacuum sealed boxes.

15. The reservoir of claim 1, wherein the thermally conductive surface is a thermally conductive base of the first vessel.

16. The reservoir of claim 15, wherein a bottom of the meshed vessel based is in physical contact with the thermally conductive base.

17. The reservoir of claim 15, further comprising a vertical hollow tube that passes through the lid and ends at an inner surface of the thermally conductive base of the first vessel.

18. The reservoir of claim 17, wherein at least one tray is vertically placed with respect to the ground, and the at least one tray is substantially parallel to the vertical hollow tube.

19. The reservoir of claim 17, wherein the at least one tray is horizontally placed with respect to the ground, and the at least one tray is substantially parallel to one or more of: the lid, the thermally conductive base, one another when the at least one tray includes multiple trays, or combinations.

20. The reservoir of claim 19, wherein the outer perimeter of the at least one tray is in a physical contact with a lateral surface of the meshed vessel.

21. The reservoir of claim 20, wherein the at least one tray is substantially perpendicular to the vertical hollow tube.

* * * * *